US012750937B2

(12) United States Patent
Chen

(10) Patent No.: US 12,750,937 B2
(45) Date of Patent: Sep. 29, 2026

(54) LIGHT STRIP ZONING SYSTEM

(71) Applicant: Dexatek Technology Ltd., New Taipei City (TW)

(72) Inventor: Hsin Yu Chen, Taipei City (TW)

(73) Assignee: Dexatek Technology Ltd., New Taipei City (TW)

( * ) Notice: Subject to any disclaimer, the term of this patent is extended or adjusted under 35 U.S.C. 154(b) by 33 days.

(21) Appl. No.: 19/020,098

(22) Filed: Jan. 14, 2025

(65) Prior Publication Data

US 2026/0206120 A1 Jul. 16, 2026

(51) Int. Cl.
*H05B 47/175* (2020.01)
*G06F 1/16* (2006.01)
*H05B 47/155* (2020.01)
*H05B 47/19* (2020.01)

(52) U.S. Cl.
CPC ....... *H05B 47/1985* (2024.01); *G06F 1/1601* (2013.01); *H05B 47/155* (2020.01); *H05B 47/19* (2020.01); *H05B 47/1965* (2024.01)

(58) Field of Classification Search
CPC .. H05B 47/1985; H05B 47/155; H05B 47/19; H05B 47/1965; G06F 1/1601
See application file for complete search history.

(56) References Cited

U.S. PATENT DOCUMENTS 10,314,149 B2 * 6/2019 Hidaka .................. H05B 45/20
11,365,875 B1 * 6/2022 Yu .......................... F21V 23/045
11,523,488 B1 * 12/2022 Recker ...................... H02J 9/02
12,338,973 B2 * 6/2025 Van Bommel .......... F21S 8/038
2006/0027081 A1 * 2/2006 Chang .................. G10H 1/0008 84/645
2017/0339774 A1 * 11/2017 Wang ................ H04M 1/72415
2019/0045603 A1 * 2/2019 Wang ..................... H05B 45/00
2020/0182453 A1 * 6/2020 Rutherford ............... F21S 4/28
2022/0196231 A1 * 6/2022 Yu ........................... F21V 23/06
2024/0306281 A1 * 9/2024 Klein ................... H05B 47/105

FOREIGN PATENT DOCUMENTS

| | | | |
|---|---|---|---|
| CN | 115243086 | A | 10/2022 |
| CN | 117320239 | A | 12/2023 |
| CN | 117615492 | A | 2/2024 |
| TW | I840046 | B | 4/2024 |

* cited by examiner

*Primary Examiner* — Adam D Houston
(74) *Attorney, Agent, or Firm* — RABIN & BERDO, P.C.

(57) ABSTRACT

A light strip zoning system includes a light strip device and a control device. The control device includes an input unit, a communication unit, and a memory unit that are electrically connected to a processing unit. The light strip device includes a light strip communication unit and lighting units that are electrically connected to a light strip processing unit. The light strip communication unit communicates with the communication unit. The lighting units are arranged in sequential order, and each of the lighting units corresponds to a unique IC chip address. A lighting mode data in a memory unit includes multiple lighting information and a node address, and each of the IC chip addresses corresponds to one of the lighting information. The lighting units with the IC chip addresses before and after the node address are configured to belong to different lighting zones that are individually controlled to light up.

9 Claims, 7 Drawing Sheets

LIGHT STRIP ZONING SYSTEM

BACKGROUND OF THE INVENTION

1. Field of the Invention

The present invention relates to a system for controlling a light strip, more particularly, a light strip zoning system that uses a control device to configure different lighting zones for a light strip device, thus customizing the light strip device for displaying more customized lighting patterns.

2. Description of the Related Art

A light strip is a structure that connects a plurality of lighting units or lighting elements, and these lighting units most commonly may be light-emitting diodes (LEDs). The lighting units may be electrically connected with each other in series or in parallels, and moreover, each of the lighting units is controlled by a controller. Currently, each of the lighting elements of the light strip may individually have an integrated circuit (IC) chip, and each of the IC chips corresponds to a unique address for the said lighting element. As a result, the controller is currently able to individually control each of the lighting elements to light up according to the unique address of the IC chip for each respective lighting element, and thus the controller is able to control the light strip to display overall unique visual effects.

However, a current limitation for controlling the light strip is that an average user of the light strip cannot configure the light strip to light up in a way that closely corresponds to how the light strip device is propped as a lighting installation. For this reason, although the current light strip is able to display changes in several lighting patterns, these lighting patterns may practically be pre-defined and inflexible for further customization changes, thus rendering the light strip unfit as a quality lighting installation under different installation postures.

With reference to FIG. 7, in an application, a light strip 1 is propped along a frame of a computer display 2 by a user. Since the light strip 1 is most often sold as a part of a complete module, the light strip 1 is subjected to only display a set of default lighting patterns. For example, when the light strip 1 receives a command for displaying green light, all lighting units within the light strip 1 display green lights as a whole.

Please consider the following application example. An internet influencer or a streamer may love to create cool looking lightings around the computer for enchanting an atmosphere of a streaming video. More particularly, the streamer desires that the light strip 1 installed around the computer display 2 to change colors according to a current screen being displayed on the computer display 2. In other words, for example, the streamer wishes that when a left side of the current screen being displayed on the computer display 2 primarily displays color green, a light strip located next to a left side of the computer display 2 would correspondingly light up green light. Simultaneously, the streamer wishes that when a right side of the current screen being displayed on the computer display 2 primarily displays color red, a light strip located next to a right side of the computer display 2 would correspondingly light up red light, etc.

However, currently, the light strip 1 may only display different colors according to a default lighting setting. In other words, even though the default lighting setting controls the lighting units to change color, the light strip 1 only changes colors as a whole and cannot be modified to change colors according to how the light strip 1 is propped, or how the light strip 1 turns around edges of the computer display 2 multiple times. As the computer display 2 may come in any arbitrary sizes, dimensions, and screen ratios, currently the light strip 1 cannot be adjusted to accommodate these arbitrary sizes, dimensions, and screen ratios, thus the light strip 1 cannot fittingly display colors as the streamer desires, because the light strip 1 cannot possibly know at what point the light strip 1 turns corners and starts to go from next to the left side of the computer display 2 to next to the right side of the computer display 2. Furthermore, since the light strip 1 is sold as a complete and pre-defined product, the light strip 1 cannot foresee how the light strip 1 will be propped by a user. For this reason, the light strip 1 lacks the capability to fittingly display light patterns according to the posture of how the light strip 1 is propped and installed by the user. For example, the light strip 1 lacks the capability to fittingly and simultaneously display different light patterns that closely resemble colors being currently displayed on the left side and the right side of the computer display 2, and thus the light strip 1 cannot satisfy the streamer's need for creating a cool lighting atmosphere for a streaming video.

SUMMARY OF THE INVENTION

To overcome the aforementioned technical problems, the present invention provides a light strip zoning system, thus allowing a light strip device of the light strip zoning system to display different colors in different customizable lighting zones. The light strip device of the light strip zoning system is free from only merely displaying pre-defined lighting patterns, such as being free from merely displaying a same color for a whole light strip.

The light strip zoning system of the present invention includes:

- a light strip device, including:
  - a light strip communication unit;
  - a plurality of lighting units; wherein each of the lighting units includes a respective integrated circuit (IC) chip address, and the lighting units are arranged in sequential order; wherein each of the IC chip addresses is unique;
  - a light strip processing unit, electrically connected to the light strip communication unit and each of the lighting units;
- a control device, including:
  - a communication unit, communicatively connected to the light strip communication unit of the light strip device;
  - a memory unit, storing a lighting mode data, wherein the lighting mode data includes a plurality of lighting information and a node address; wherein each of the IC chip addresses corresponds to one of the lighting information; wherein at least one of the lighting units with the IC chip address sequentially before the node address and at least one of the lighting units sequentially with the IC chip address after the node address are the lighting units that belong to different lighting zones;
  - an input unit;
  - a processing unit, electrically connected to the communication unit, the memory unit, and the input unit;
  - wherein when the processing unit receives a start lighting signal from the input unit, the processing unit generates a lighting command according to the lighting mode data stored in the memory unit, and sends the lighting command through the communication unit to the light strip device;

wherein when the light strip processing unit receives the lighting command through the light strip communication unit, the light strip processing unit respectively controls the lighting units of the lighting zones to individually light up according to the lighting command.

Apart from using the IC chip addresses to control the lighting units, the control device of the present invention further uses the node address as a reference for zoning the lighting units into different lighting zones. In other words, the control device configures at least one of the lighting units with the IC chip address sequentially before the node address and at least one of the lighting units with the IC chip address sequentially after the node address as belonging to different lighting zones, and thus the control device is able to control the light strip device to individually light up same or different lighting effects for each of the lighting zones. As such, the light strip device is able to light up more flexibly than merely having pre-defined lighting patterns.

In an application, the control device is allowed to define that the node address corresponds to an edge of a computer display, and thus achieving the following: once wrapped the light strip device around a frame of a computer display, configuring the node address so that the lighting units corresponding to the left side of the computer display and the lighting units corresponding to the right side of the computer display respectively belong to different lighting zones according to the node address; then subsequently controlling the lighting units on the left side of the computer display and on the right side of the computer display to display different lighting effects, such as to display different colors.

DETAILED DESCRIPTION OF THE INVENTION

Figure 1:
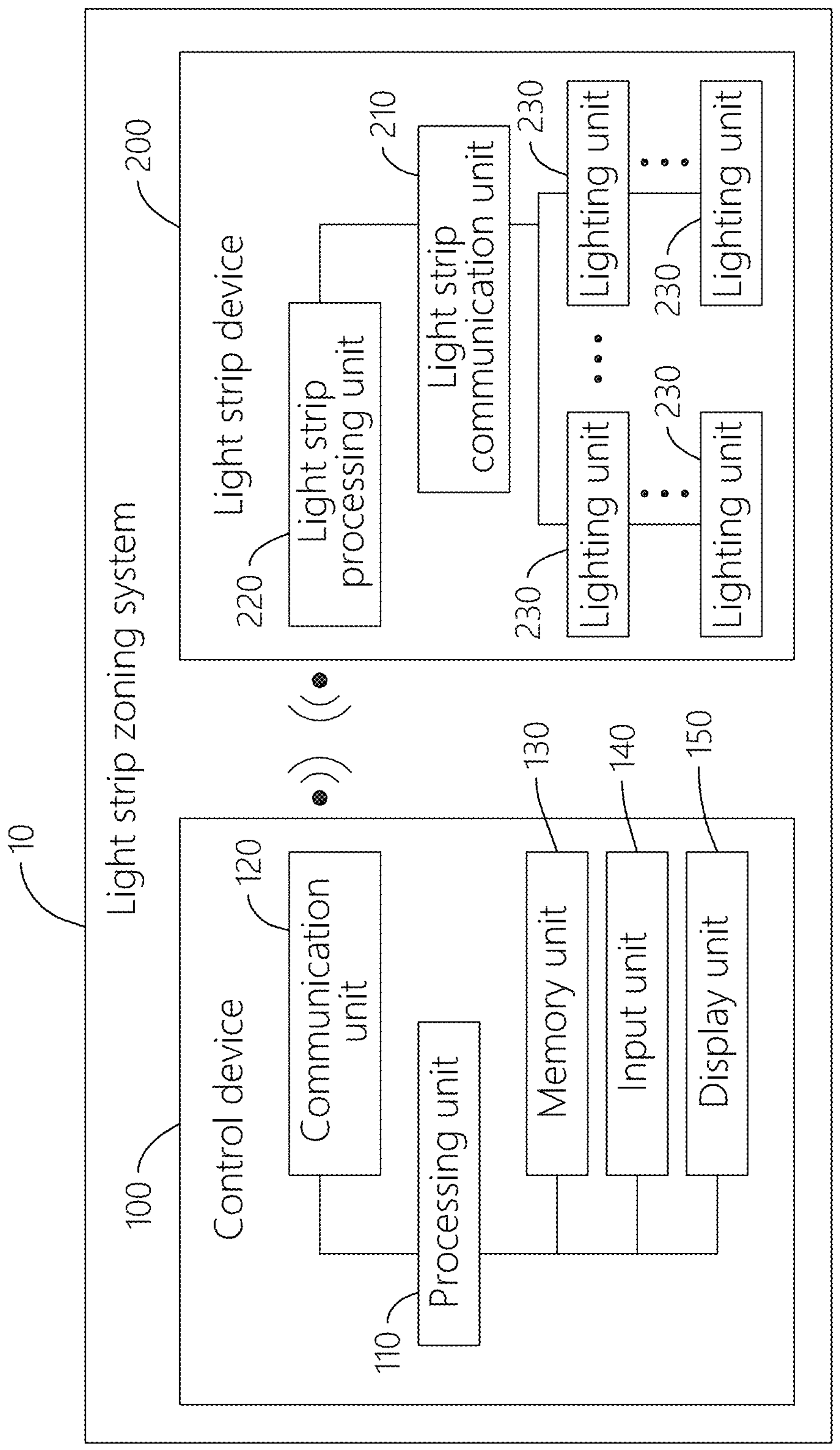
FIG. 1 is a block diagram of a light strip zoning system of the present invention.

With reference to FIG. 1, the present invention provides a light strip zoning system 10. The light strip zoning system 10 includes a control device 100 and a light strip device 200, and the control device 100 and the light strip device 200 are communicatively connected.

The control device 100 includes a processing unit 110, a communication unit 120, a memory unit 130, and an input unit 140. The processing unit 110 is respectively electrically connected to the communication unit 120, the memory unit 130, and the input unit 140.

The light strip device 200 includes a light strip processing unit 210, a light strip communication unit 220, and a plurality of lighting units 230. The light strip processing unit 210 is electrically connected to the light strip communication unit 220 and the plurality of lighting units 230. Moreover, the light strip communication unit 220 of the light strip device 200 is communicatively connected to the communication unit 120 of the control device 100. As such, the processing unit 110 of the control device 100 and the light strip processing unit 210 of the light strip device 200 are communicatively connected through the communication unit 120 and the light strip communication unit 220.

In an embodiment of the present invention, the communication unit 120 and the light strip communication unit 220 are wirelessly communicatively connected. In another embodiment of the present invention, the communication unit 120 and the light strip communication unit 220 are communicatively connected through a hard wire. In other words, the control device 100 and the light strip device 200 may be communicatively connected through a wireless network or a wired network, thus allowing the control device 100 to control the light strip device 200.

Each of the lighting units 230 of the light strip device 200 respectively has an integrated circuit (IC) chip address, and each of the IC chip addresses is unique. Furthermore, the lighting units 230 are arranged in sequential order. In an embodiment, each of the lighting units 230 is respectively a light-emitting diode (LED) unit that is mounted on a printed circuit board (PCB), and each of the LED units includes an IC chip, and each of the chips stores the respective unique IC chip address. As such, the light strip processing unit 210 may, according to each of the IC chip addresses, respectively notify each of the lighting units 230 exactly how to light up. Under the present invention, the lighting units 230 are free to electrically connect to each other with various forms of electrical connections. As shown in FIG. 1, generally speaking, the lighting units 230 of the present invention may electrically connect with each other in any combinations of series and parallel connections, as long as the lighting units 230 are all controlled by the light strip processing unit 210 according to the IC chip addresses. In an embodiment, each of the LED units may be a multi-colored lighting element. In other embodiment, each of the LED units may be a single-colored lighting element.

The memory unit 130 of the control device 100 stores a lighting mode data, and the lighting mode data includes a plurality of lighting information, at least one node address, and a plurality of lighting sequence numbers. Each of the lighting units 230 corresponds to one of the IC chip addresses, and each of the IC chip address corresponds to one of the lighting information. Each of the lighting sequence numbers corresponds to the IC chip address of one of the lighting units 230. Furthermore, a sequence of the lighting sequence numbers corresponds to the sequential order of how the lighting units 230 are controlled to light up. Overall, the light strip processing unit 210 updates the lighting units 230 to display a lighting effect in the sequential order, thus the light strip processing unit 210 overall follows the light sequence numbers for updating the lighting units 230, however, crucially and especially, in the present invention, the lighting units 230 are zoned into different lighting zones according to the node address, thus also affecting how the lighting units 230 are updated. The processing unit 110 of the present invention recognizes the lighting unit 230 that corresponds to the node address as a zone-divider lighting unit. The zone-divider lighting unit, as the name suggests, is used for dividing different lighting zones for the lighting units 230. Therefore, according to the sequential number, the processing unit 110 configures the lighting units 230 before the zone-divider lighting unit and the lighting units 230 after the zone-divider lighting unit as belonging to different lighting zones. Subsequently, the light strip processing unit 210 notifies each of the lighting units 230 when to light up and with what color according to each of the respective lighting information that individually corresponds to one of the respective IC chip addresses.

When the processing unit 110 receives a start lighting signal from the input unit 140, the processing unit 110 generates a lighting command according to the lighting mode data stored in the memory unit 130, and sends the lighting command through the communication unit 120 to the light strip communication unit 220 of the light strip device 200.

When the light strip processing unit 210 receives the lighting command through the light strip communication unit 220, the light strip processing unit 210 respectively controls the lighting units 230 of the lighting zones to individually light up according to the lighting command. As a result, the light strip zoning system 10 would then be able to subsequently control the lighting units 230 of the different lighting zones to light up with same or different visual effects, thus allowing the light strip device 200 to light up more flexibly with more degrees of freedom.

More particularly, a user of the present invention is able to control the input unit 140 of the control device 100, and the input unit 140 is able to generate and output signals to the processing unit 110 of the control device 100 according to the user's manipulation and control of the input unit 140.

When the processing unit 110 receives a zone configuration signal outputted by the input unit 140, the processing unit 110 generates a test command and sends out the test command through the communication unit 120 to the light strip communication unit 220. The processing unit 110 then determines whether receiving a return address signal outputted by the input unit 140. When the processing unit 110 receives the return address signal from the input unit 140, the processing unit 110 sends out a return address command through the communication unit 120 to the light strip communication unit 220. When the processing unit 110 has yet to receive the return address signal from the input unit 140, the processing unit 110 refrains from sending out the return address command to the light strip communication unit 220.

When the light strip processing unit 210 receives the test command through the light strip communication unit 220, the light strip processing unit 210 controls each of the lighting units 230 to light up in the sequential order as instructed by the test command. Simultaneously, the light strip processing unit 210 sends back (returns) the IC chip address corresponding to the lighting unit 230 that is lighting up according to the test command to the processing unit 110. When the processing unit 110 receives the said IC chip address returned from the light strip processing unit 210 through the light strip communication unit 220 and the communication unit 120, the processing unit 110 configures the returned IC chip address as the node address. As a result, the processing unit 110 would then be able to identify the zone-divider lighting unit according to the node address, and further understand how to configure the lighting units 230 into different lighting zones according to the zone-divider lighting unit.

For example, in an embodiment, when the light strip processing unit 210 controls the lighting units 230 to light up according to the test command, the light strip processing unit 210 is particularly controlling the lighting units 230 so that in any single moment, only one of the lighting units 230 is lighting up. As a result, the one lighting unit 230 lighting up by the test command in any single moment is considered a tester lighting unit. By looking at where exactly the tester lighting unit is lighting up on the light strip device 200, the user of the present invention would understand when to exactly manipulate the input unit 140, so that the input unit 140 generates and sends the return address signal to the processing unit 110 at the right time. Please consider the following: when the user sees that the tester lighting unit is lighting up on the light strip device 200 at a particular position corresponding to a corner of how the light strip device 200 is propped and installed, the user may consciously decide with one's own free will whether wishing to use the corner as a divider for separating the lighting units 230 into different lighting zones. If the user wishes to use the corner as the divider for separating the lighting units 230 into different lighting zones, then when the tester lighting unit is lighting up at the corner where the light strip device 200 turns, the user may engage in manipulating the input unit 140, thus allowing the input unit 140 to generate and to send the return address signal to the processing unit 110.

When the processing unit 110 receives the return address signal from the input unit 140, the processing unit 110 thus sends the return address command through the communication unit 120 to the light strip communication unit 220. When the light strip processing unit 210 receives the return address command through the light strip communication unit 220, the light strip processing unit 210 thus returns the IC chip address corresponding to the latest lighting unit 230 that is lighting up according to the test command back to the processing unit 110 to be configured into the node address. In other words, the light strip processing unit 210 returns the IC chip address corresponding to the only one lighting unit 230 that is currently lighting up back to the processing unit 110 to be configured into the node address.

In another embodiment of the present invention, when the light strip processing unit 210 controls the lighting units 230 to light up according to the test command, among the lighting units 230, at every single moment a new one of the lighting units 230 starts to light up, and simultaneously the light units 230 lit up in previous moments stay lighting up. As a result, the one light unit 230 most recently started to light up is considered to be the tester lighting unit. The user may visually follow the lighting units 230 that are lit up to find out the most recently lit up one of the lighting units 230, and thus the user would understand where the tester lighting unit is located among the lighting unit 230.

Figure 2:
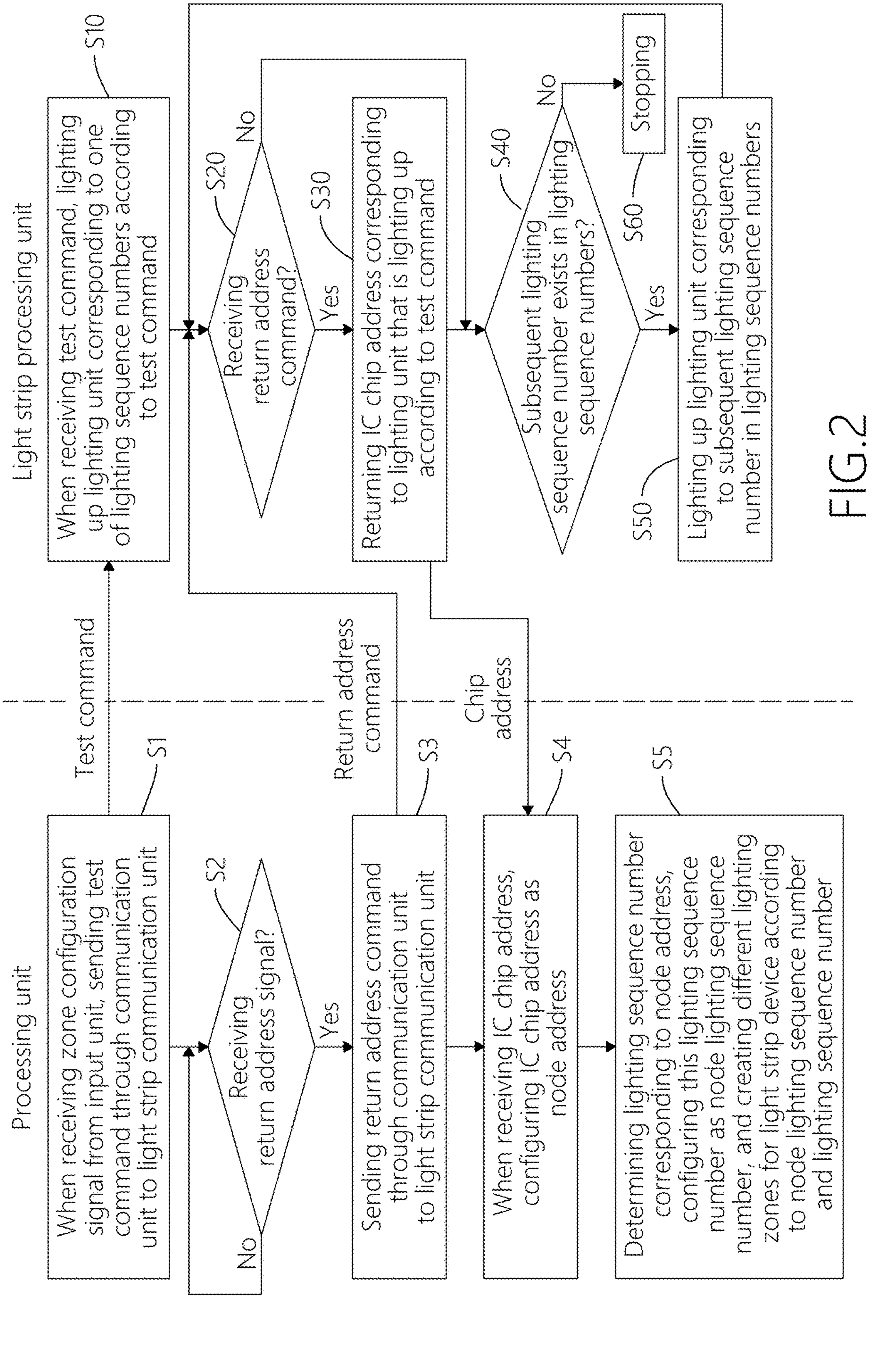
FIG. 2 is a flow chart of steps executed by the light strip zoning system of the present invention.

With reference to FIG. 2, all aforementioned embodiments may have the processing unit 110 and the light strip processing unit 210 generalized to execute the below steps in the present invention.

Steps that are executed by the processing unit 110:

step S1: when receiving the zone configuration signal from the input unit 140, sending the test command through the communication unit 120 to the light strip communication unit 220;

step S2: determining whether receiving the return address signal outputted by the input unit 140; when not receiving the return address signal, executing step S2;

step S3: when receiving the return address signal, sending the return address command through the communication unit 120 to the light strip communication unit 220;

step S4: when receiving the chip address returned from the light strip processing unit 210 through the communication unit 120 and the light strip communication unit 220, configuring the returned chip address as the node address;

step S5: determining the lighting sequence number corresponding to the node address according to the lighting mode data, configuring this lighting sequence number as a node lighting sequence number, and creating different lighting zones for the light strip device 200 (zoning the light strip device 200) according to the node lighting sequence number and the lighting sequence numbers.

Steps that are executed by the light strip processing unit 210:

step S10: when receiving the test command through the light strip communication unit 220, lighting up the lighting unit 230 corresponding to one of lighting sequence numbers according to the test command;

step S20: determining whether receiving the return address command through the light strip communication unit 220; when not receiving the return address command through the light strip communication unit 220, executing step S40;

step S30: when receiving the return address command through the light strip communication unit 220, returning the IC chip address corresponding to the lighting unit 230 that is lighting up according to the test command back to the processing unit 110;

step S40: determining whether a subsequent lighting sequence number exists in the lighting sequence numbers;

step S50: when the subsequent lighting sequence number still exists in the lighting sequence numbers, lighting up the lighting unit 230 corresponding to the subsequent lighting sequence number in the lighting sequence numbers, and executing step S20;

step S60: when the subsequent lighting sequence number is non-existent in the lighting sequence numbers, stopping returning the IC chip address to the processing unit 110.

More particularly, in an embodiment of the present invention, the lighting sequence numbers are sequenced in ascending order. When the processing unit 110 configures different lighting zones according to the node lighting sequence number and the lighting sequence numbers, the processing unit 110 configures at least one of the lighting sequence numbers less than the node lighting sequence number as corresponding to a first lighting zone, and the processing unit 110 configures at least one of the lighting sequence numbers greater than or equal to the node lighting sequence number as corresponding to a second lighting zone. In other words, for the one lighting unit 230 corresponding to the node address, not only this one lighting unit 230 is used to assign the first lighting zone and the second lighting zone, but also this one lighting unit 230 is assigned to be part of the second lighting zone.

In an embodiment of the present invention, the lighting sequence numbers are sequenced in ascending order. When the processing unit 110 configures different lighting zones according to the node lighting sequence number and the lighting sequence numbers, the processing unit 110 configures at least one of the lighting sequence numbers less than or equal to the node lighting sequence number as corresponding to the first lighting zone, and the processing unit 110 configures at least one of the lighting sequence numbers greater than the node lighting sequence number as corresponding to the second lighting zone. In other words, for the one lighting unit 230 corresponding to the node address, not only this one lighting unit 230 is used to assign the first lighting zone and the second lighting zone, but also this one lighting unit 230 is assigned to be part of the first lighting zone.

In an embodiment of the present invention, the lighting sequence numbers are sequenced in descending order. When the processing unit 110 configures different lighting zones according to the node lighting sequence number and the lighting sequence numbers, the processing unit 110 configures at least one of the lighting sequence numbers greater than the node lighting sequence number as corresponding to the first lighting zone, and the processing unit 110 configures at least one of the lighting sequence numbers less than or equal to the node lighting sequence number as corresponding to the second lighting zone. As a result, for the one lighting unit 230 corresponding to the node address, this one lighting unit 230 is assigned to be part of the second lighting zone.

In an embodiment of the present invention, the lighting sequence numbers are sequenced in descending order. When the processing unit 110 configures different lighting zones according to the node lighting sequence number and the lighting sequence numbers, the processing unit 110 configures at least one of the lighting sequence numbers greater than or equal to the node lighting sequence number as corresponding to the first lighting zone, and the processing unit 110 configures at least one of the lighting sequence numbers less than the node lighting sequence number as corresponding to the second lighting zone. As a result, for the one lighting unit 230 corresponding to the node address, this one lighting unit 230 is assigned to be part of the first lighting zone.

Once configuring (zoning) the lighting units 230 into different lighting zones, such as into the first lighting zone and the second lighting zone, when the light strip processing unit 210 receives the lighting command through the light strip communication unit 220 and subsequently controls the lighting units 230 in the different lighting zones to individually light up, the light strip processing unit 210 is particularly controlling the lighting units 230 correspondingly assigned to the first lighting zone and the lighting units 230 correspondingly assigned to the second lighting zone to individually light up different visual effects.

Figure 3:
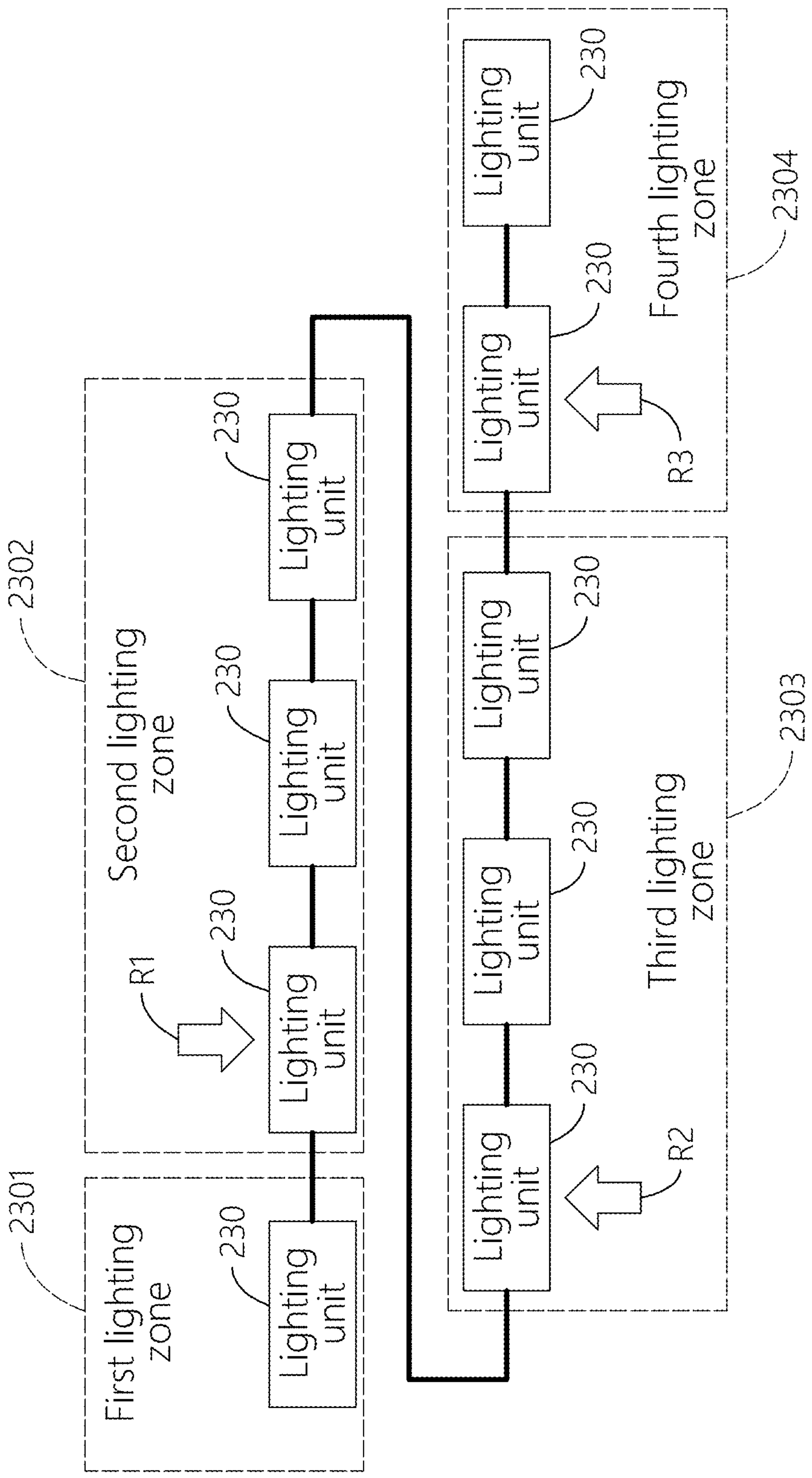
FIG. 3 is a perspective view of lighting zones created out of lighting units of the light strip zoning system of the present invention.

With reference to FIG. 3, for example, in an embodiment of the present invention, the light strip device 200 includes a total of nine lighting units 230. A starting head of the lighting units 230 in FIG. 3 is the lighting unit 230 located on the left top corner, and an ending tail of the lighting units 230 in FIG. 3 is the lighting unit 230 located on the right bottom corner. When the light strip processing unit 210 controls the light units 230 to light up in sequence according to the test command, the tester lighting unit thus lights up and moves in sequential order from the starting head of the lighting units 230 on the left top corner to the ending tail of the lighting units 230 on the right bottom corner along the rest of the lighting units 230 in the middle. In this process of the tester lighting unit moving in sequential order, the user may, at multiple different points in time, manipulate the input unit 140, so that the input unit 140 sends out a plurality of the return address signals to the processing unit 110. For example, the input unit 140 may send the return address signals three times to the processing unit 110.

When the processing unit 110 receives the return address signals from the input unit 140 multiple times, the processing unit 110 counts that first time receiving the return address signal as receiving a first return address signal, the second time receiving the return address signal as receiving a second return address signal, and so forth. Furthermore, the processing unit 110 also counts that first time sending the return address command as sending a first return address command, the second time sending the return address command as sending a second return address command, and so forth. As a result, as shown in FIG. 3, in this example, the processing unit 110 sends out a first return address command R1, a second return address command R2, and a third return address command R3 at different instances. Furthermore, the first return address command R1, the second return address command R2, and the third return address command R3 are used to appoint a plurality of zone-divider lighting units at different times for configuring (zoning) the lighting units 230 into a first lighting zone 2301, a second lighting zone 2302, a third lighting zone 2303, and a fourth lighting zone 2304.

In the present embodiment, when the processing unit 110 generates the lighting command according to the lighting zones assigned according to the lighting mode data, such as according to the first lighting zone 2301, the second lighting zone 2302, the third lighting zone 2303, and the fourth lighting zone 2304, the processing unit 110 respectively controls the one lighting unit 230 corresponding to the first lighting zone 2301, controls the three lighting units 230 corresponding to the second lighting zone 2302, controls the three lighting units 230 corresponding to the third lighting zone 2303, and controls the two lighting units 230 corresponding to the fourth lighting zone 2304 to generate different lighting effects.

Of course, in another embodiment, the processing unit 110 may also control some parts of the lighting zones to generate same lighting effects and control some other parts of the lighting zones to generate different lighting effects. For example, the processing unit 110 may control the one lighting unit 230 corresponding to the first lighting zone 2301 and the two lighting units 230 corresponding to the fourth lighting zone 2304 to switch off, and only lights up the three lighting units 230 corresponding to the second lighting zone 2302 and the three lighting units 230 corresponding to the third lighting zone 2303.

Figure 4:
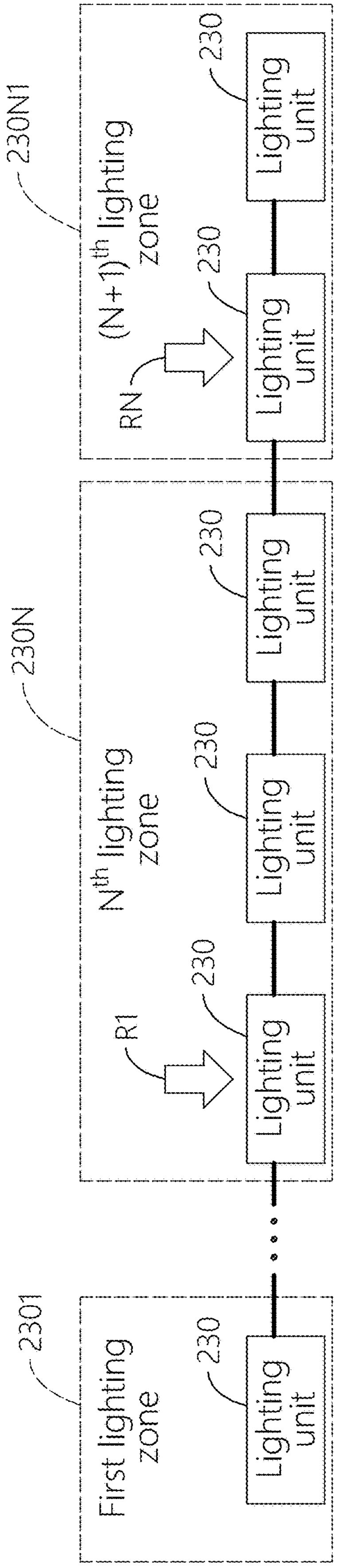
FIG. 4 is another perspective view of lighting zones created out of lighting units of the light strip zoning system of the present invention.

With reference to FIG. 4, more generally speaking, the processing unit 110 is able to receive the return address signals for N times from the input unit 140, wherein N is a positive integer greater than one. As such, the processing unit 110 would send out the first return address command R1 to an $N^{th}$ return signal command RN at different instances. When the processing unit 110 receives the node address for the $N^{th}$ times, the processing unit 110 would view the first time receiving the node address as receiving a first node address, and view the $N^{th}$ time receiving the node address as receiving an $N^{th}$ node address.

The processing unit 110 finds the lighting sequence number corresponding to the first node address according to the lighting mode data, and the processing unit 110 configures this lighting sequence number to be a first node lighting sequence number. Similarly, the processing unit 110 finds the lighting sequence number corresponding to the $N^{th}$ node address according to the lighting mode data, and the processing unit 110 configures this said lighting sequence number to be an $N^{th}$ node lighting sequence number, and so forth.

In this example, the first return address command R1 to the $N^{th}$ return address command RN are used to appoint a plurality of the tester lighting units at different instances for assigning the lighting units 230 to be in the first lighting zone 2301 to an $N^{th}$ lighting zone 230N and an $(N+1)^{th}$ lighting zone 230N1. More particularly, the processing unit 110 configures the at least one lighting sequence number before the first node lighting sequence number to correspond to the first lighting zone 2301, configures the at least one lighting sequence number between the first node lighting sequence number and the $N^{th}$ node lighting sequence number to correspond to the $N^{th}$ lighting zone 230N, and configures the at least one lighting sequence number after the $N^{th}$ node lighting sequence number to correspond to the $(N+1)^{th}$ lighting zone 230N1, and so forth. As a result, according to the return address signals that the processing unit 110 receives N times, the processing unit 110 zones the lighting units 230 into (N+1) different lighting zones, for allowing the lighting units 230 of the light strip device 200 to able to generate at most a total of (N+1) independent lighting effects.

Figure 5:
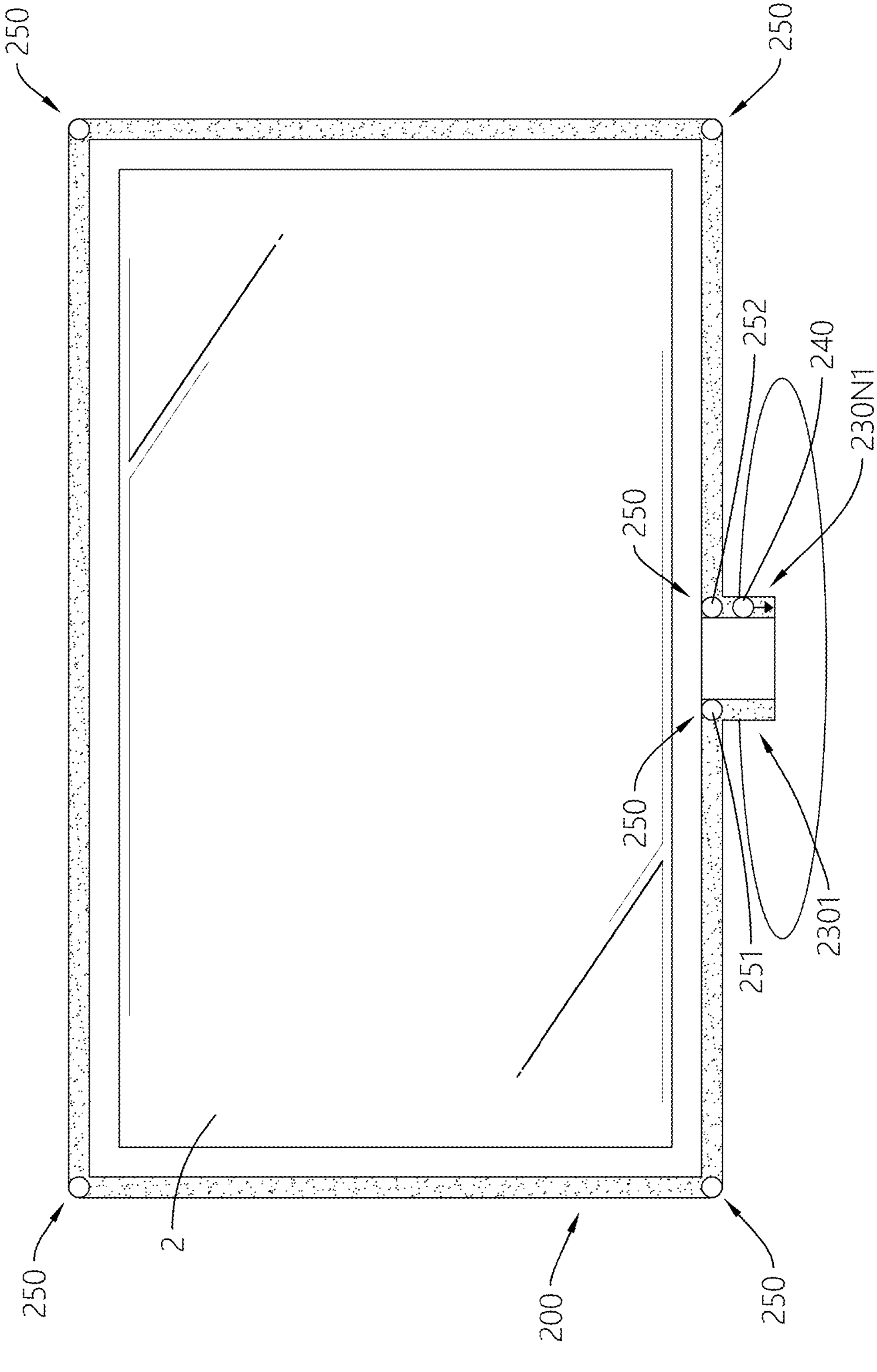
FIG. 5 is a perspective view of lighting units of the light strip zoning system of the present invention wrapped around a computer display.

With reference to FIG. 5, in an embodiment of the present invention, the lighting units 230 of the light strip device 200 are wrapped around a computer display 2. The light strip communication unit 220 of the light strip device 200 is configured to communicatively connect a mainboard of a computer that is electrically connected to the computer display 2, thus, the light strip device 200 is able to receive information about displaying colors (on edges of) of the computer display 2 from the mainboard of the computer. In order for the lighting units 230 to fittingly display lighting visual effects in collaboration with the computer display 2, the lighting units 230 would have to take into considerations of a size, a dimension, and a screen ratio of the computer display 2. In other words, in order for: the lighting units 230 located next to a bottom part of the computer display 2 to display a color being displayed at the bottom part of the computer display 2, the lighting units 230 located next to a left side of the computer display 2 to display a color being displayed at the left side of the computer display 2, and the lighting units 230 located next to a right side of the computer display 2 to display a color being displayed at the right side of the computer display 2, the present invention provides the user with a function of zoning, programming, and configuring the lighting units 230 to be under different lighting zones, thus allowing the different lighting zones, assigned corresponding to the bottom part, the left side, and the right side of the computer display 2, to display independent lighting visual effects.

With reference to FIG. 5, when the light strip processing unit 210 controls each of the lighting units 230 to light up according to the test command, a tester lighting would then move from a side (the starting head) of the lighting units 230 to an opposite side (the ending tail) of the lighting units 230 in the light strip device 200.

In this embodiment, the processing unit 110 sends out a total of six return address commands at different instances, and correspondingly, the processing unit 110 receives a plurality of the node addresses at different instances. The processing unit 110 sets the first received node address as the first node address, and along the same logic, the processing unit 110 sets the sixth received node address as a sixth node address. Whenever the processing unit 110 receives one of the node addresses, the processing unit 110 commands the light strip processing unit 210 to light up the one lighting unit 230 corresponding to the said node address as a zone-divider lighting unit 250. As a result, by looking at the zone-divider lighting units 250 that are lighting up, the user may clearly see the plurality of lighting units 230 that are used as the zone-divider lighting units 250 for assigning different lighting zones. As shown in FIG. 5, in this example, a total of six zone-divider lighting units 250 are lighting up in the light strip device 200, and these zone-divider lighting units 250 are used to divide the lighting units 230 of the light strip device 200 into a total of seven different lighting zones.

Furthermore, the zone-divider lighting unit 250 first lit up in the light strip device 200 is a starting lighting unit 251, and the zone-divider lighting unit 250 last lit up in the light strip device 200 is an ending lighting unit 252. The at least one lighting unit 230 before the starting lighting unit 251 is assigned to the first lighting zone 2301, and the at least one lighting unit 230 after the ending lighting unit 252 is assigned to the $(N+1)^{th}$ lighting zone 230N1. In the present invention, according to one application, the lighting units 230 belonging to the first lighting zone 2301 and the $(N+1)^{th}$ lighting zone 230N1 are controlled to switch off, and only the lighting units 230 between the first lighting zone 2301 and the $(N+1)^{th}$ lighting zone 230N1 are controlled to light up. As a result, only parts of the light strip device 200 that are wrapped around a frame of the computer display 2 are lighting up, the rest of the light strip device 200 away from the computer display 2 are switched off. Thus, the present invention fittingly only lights up the lighting units 230 needed for extending the colors displayed along the frames of the computer display 2, and switches off the excessive lighting units 230 located away from the computer display 2 for energy conservation in this embodiment.

Figure 6:
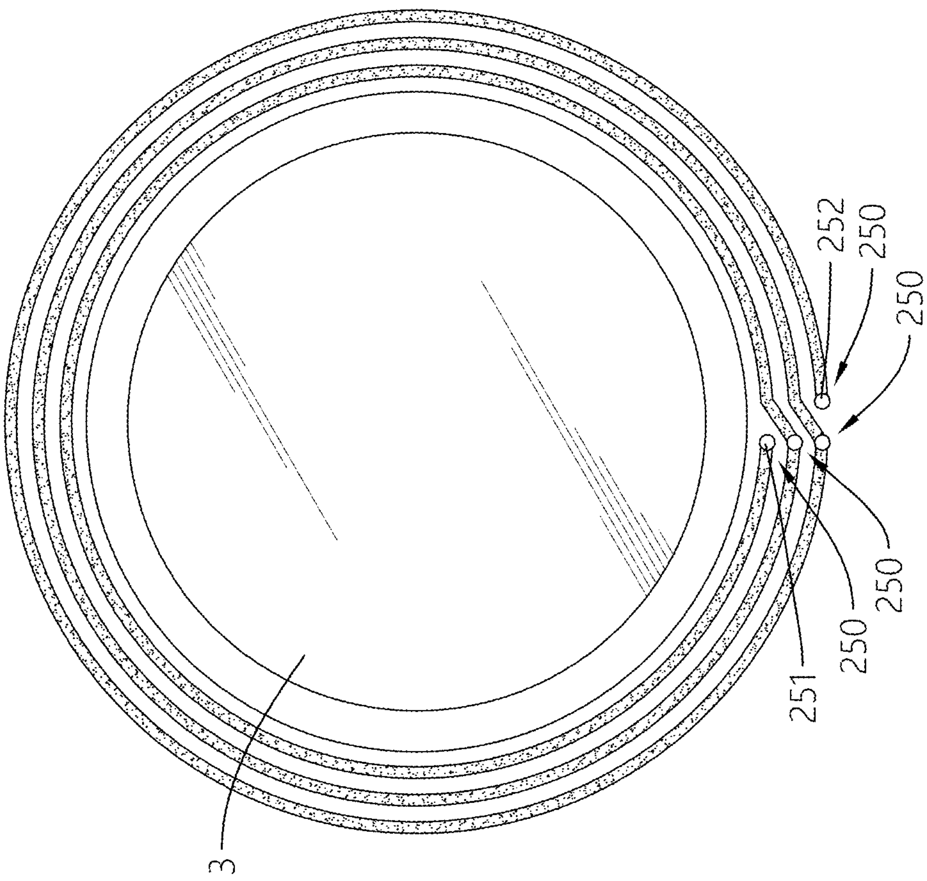
FIG. 6 is a perspective view of lighting units of the light strip zoning system of the present invention wrapped around a mirror.
Figure 7:
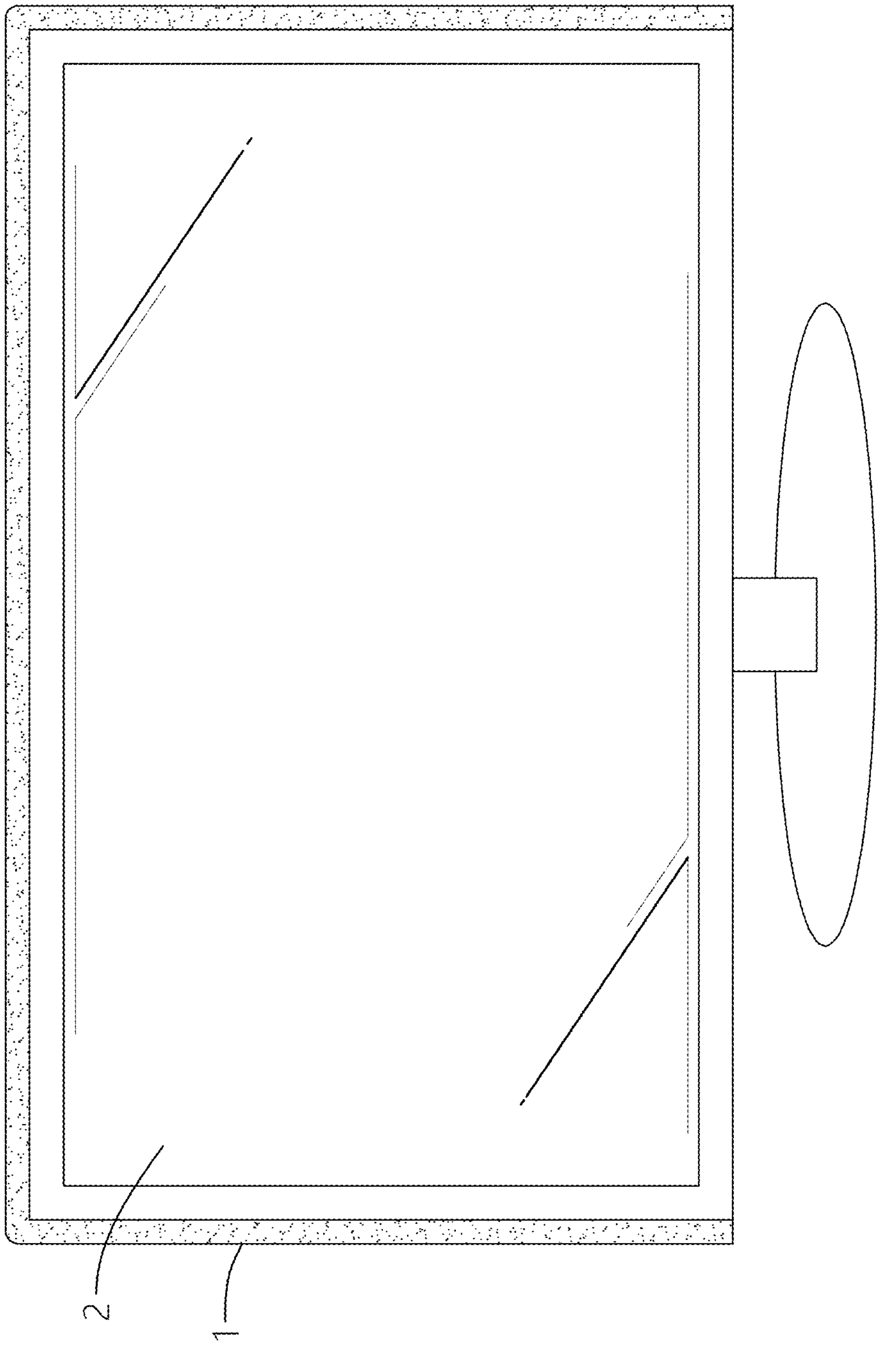
FIG. 7 is a perspective view of an ordinary light strip wrapped around a computer display.

With reference to FIG. 6, in another embodiment of the present invention, the lighting units 230 are propped and installed to encircle a mirror 3 multiple times. The processing unit sends out a total of four return address commands at different instances. Moreover, between the starting lighting unit 251 and the ending lighting unit 252, the light strip device 200 is zoned into three different lighting zones, wherein each of the different lighting zones encircles the mirror 3 once. In an embodiment, the different lighting zones respectively generate different lighting effects, for instance, the lighting zone located closest to the mirror 3 may display a brightest color, the lighting zone located furthest away from the mirror 3 may display a dimmest color, and the lighting zone located between the two other lighting zones may display a color and brightness gradient as a lighting effect.

The lighting visual effects described by the aforementioned embodiments are free to be elsewise. In other words, the present invention does not limit which exact lighting visual effects are configured by the lighting mode data that is stored in the memory unit 130 of the control device 100. The present invention, however, does explicitly claim for the processing unit 110 of the control device 100 to provide a function of configuring different lighting zones for the lighting units 230 according to the user's input and according to the node address returned by the light strip device 200. Also, the present invention also claims for the processing unit 110 to output the lighting command according to the different lighting zones assigned in the lighting mode data.

In an embodiment of the present invention, the control device 100 is a smart device capable of having network connections, such as a smart phone, a tablet computer, a laptop, or a desktop computer. As shown in FIG. 1, the control device 100 also includes a display unit 150, and the display unit 150 is electrically connected to the processing unit 110. The processing unit 110 executes an application (App) for controlling the light strip device 200, and the processing unit 110 also controls the display unit 150 to display a software interface for the App. The software interface is able to present a plurality of options that allows the user to make decisions through manipulating the input unit 140 in response to the displayed options. For example, when the control device 100 is the smart phone, the input unit 140 and the display unit 150 are a touch screen. The user is able to make decisions by selecting the options presented on the touch screen. For example, when the control device 100 is the desktop computer, the input unit 140 is a mouse and a keyboard, and the user is able to manipulate the mouse and the keyboard for choosing the options. In any case, for the embodiments wherein the control device 100 is the smart device capable of having network connections, the control device 100 displays the software interface through the display unit 150, and according to the option selected by the user through the input unit 140, the input unit 140 of the control device 100 would output one of the start lighting signal, the zone configuration signal, and the return address signal to the processing unit 110, thus allowing the processing unit 110 to subsequently communicatively contact the light strip device 200 for executing the aforementioned technical functions of zoning the lighting units 230 into different lighting zones and lighting up the lighting units 230 with regards to the different lighting zones in a more flexible manner.

What is claimed is:

1. A light strip zoning system, comprising:
- a light strip device, comprising:
  - a light strip communication unit;
  - a plurality of lighting units; wherein each of the lighting units comprises a respective integrated circuit (IC) chip address, and the lighting units are arranged in sequential order; wherein each of the IC chip addresses is unique; and
  - a light strip processing unit, electrically connected to the light strip communication unit and each of the lighting units; and
- a control device, comprising:
  - a communication unit, communicatively connected to the light strip communication unit of the light strip device;
  - a memory unit, storing a lighting mode data, wherein the lighting mode data comprises a plurality of lighting information and a node address; wherein each of the IC chip addresses corresponds to one of the lighting information; wherein at least one of the lighting units with the IC chip address sequentially before the node address and at least one of the lighting units with the IC chip address sequentially after the node address are lighting units that belong to different lighting zones;
  - an input unit; and
  - a processing unit, electrically connected to the communication unit, the memory unit, and the input unit;
- wherein when the processing unit receives a start lighting signal from the input unit, the processing unit generates a lighting command according to the lighting mode data stored in the memory unit, and sends the lighting command through the communication unit to the light strip device;
- wherein when the light strip processing unit receives the lighting command through the light strip communication unit, the light strip processing unit respectively controls the lighting units of the lighting zones to individually light up according to the lighting command;
- wherein when the processing unit receives a zone configuration signal from the input unit, the processing unit sends out a test command through the communication unit to the light strip communication unit, and the processing unit determines whether receiving a return address signal outputted by the input unit; and when the light strip processing unit receives the test command through the light strip communication unit, the light strip processing unit controls each of the lighting units to light up in sequential order according to the test command;

wherein when the processing unit receives the return address signal from the input unit, the processing unit sends out a return address command through the communication unit to the light strip communication unit; the light strip processing unit sends back the IC chip address corresponding to the lighting unit that is lighting up according to the test command to the processing unit; and wherein when the processing unit receives the said IC chip address returned from the light strip processing unit, the processing unit configures the returned IC chip address as the node address.

2. The light strip zoning system as claimed in claim 1, wherein the lighting mode data comprises a plurality of lighting sequence numbers in a sequence, and each of the lighting sequence numbers corresponds to the IC chip address of one of the lighting units;

wherein when the light strip processing unit controls each of the lighting units to light up according to the test command, the light strip processing unit executes the following steps:

step S10: lighting up the lighting unit corresponding to one of the lighting sequence numbers according to the test command;

step S20: determining whether receiving the return address command through the light strip communication unit; when not receiving the return address command through the light strip communication unit, executing step S40;

step S30: when receiving the return address command through the light strip communication unit, returning the IC chip address corresponding to the lighting unit that is lighting up according to the test command back to the processing unit;

step S40: determining whether a subsequent lighting sequence number exists in the lighting sequence numbers;

step S50: when the subsequent lighting sequence number still exists in the lighting sequence numbers, lighting up the lighting unit corresponding to the subsequent lighting sequence number in the lighting sequence numbers, and executing step S20;

step S60: when the subsequent lighting sequence number is non-existent in the lighting sequence numbers, stopping returning the IC chip address to the processing unit.

3. The light strip zoning system as claimed in claim 2, wherein the lighting sequence numbers are sequenced in ascending order;

wherein once the processing unit configures the returned IC chip address as the node address, the processing unit executes the following steps:

determining the lighting sequence number corresponding to the node address according to the lighting mode data, and configuring this lighting sequence number as a node lighting sequence number;

configuring at least one of the lighting sequence numbers less than the node lighting sequence number as corresponding to a first lighting zone, and configuring at least one of the lighting sequence numbers greater than or equal to the node lighting sequence number as corresponding to a second lighting zone.

4. The light strip zoning system as claimed in claim 2, wherein the lighting sequence numbers are sequenced in ascending order;

wherein once the processing unit configures the returned IC chip address as the node address, the processing unit executes the following steps:

determining the lighting sequence number corresponding to the node address according to the lighting mode data, and configuring this lighting sequence number as a node lighting sequence number;

configuring at least one of the lighting sequence numbers less than or equal to the node lighting sequence number as corresponding to a first lighting zone, and configuring at least one of the lighting sequence numbers greater than the node lighting sequence number as corresponding to a second lighting zone.

5. The light strip zoning system as claimed in claim 2, wherein the lighting sequence numbers are sequenced in descending order;

wherein once the processing unit configures the returned IC chip address as the node address, the processing unit executes the following steps:

determining the lighting sequence number corresponding to the node address according to the lighting mode data, and configuring this lighting sequence number as a node lighting sequence number;

configuring at least one of the lighting sequence numbers greater than the node lighting sequence number as corresponding to a first lighting zone, and configuring at least one of the lighting sequence numbers less than or equal to the node lighting sequence number as corresponding to a second lighting zone.

6. The light strip zoning system as claimed in claim 2, wherein the lighting sequence numbers are sequenced in descending order;

wherein once the processing unit configures the returned IC chip address as the node address, the processing unit executes the following steps:

determining the lighting sequence number corresponding to the node address according to the lighting mode data, and configuring this lighting sequence number as a node lighting sequence number;

configuring at least one of the lighting sequence numbers greater than or equal to the node lighting sequence number as corresponding to a first lighting zone, and configuring at least one of the lighting sequence numbers less than the node lighting sequence number as corresponding to a second lighting zone.

7. The light strip zoning system as claimed in claim 2, wherein when the processing unit receives the return address signal for N times from the input unit, the processing unit outputs the return address command for N times through the communication unit to the light strip communication unit, and the processing unit receives a total of N different node addresses through the communication unit; wherein N is a positive integer greater than one;

wherein the processing unit configures the node address received for the first time as a first node address, and the processing unit configures the node address received for the $N^{th}$ time as an $N^{th}$ node address;

wherein the processing unit configures the lighting sequence number corresponding to the first node address as a first node lighting sequence number, and the processing unit configures the lighting sequence number corresponding to the $N^{th}$ node address as an $N^{th}$ node lighting sequence number;

wherein the processing unit configures the at least one lighting sequence number before the first node lighting sequence number to correspond to a first lighting zone, the processing unit configures the at least one lighting sequence number between the first node lighting sequence number and the $N^{th}$ node lighting sequence number to correspond to an $N^{th}$ lighting zone, and the processing unit configures the at least one lighting sequence number after the $N^{th}$ node lighting sequence number to correspond to an $(N+1)^{th}$ lighting zone.

8. The light strip zoning system as claimed in claim 7, wherein when the light strip processing unit respectively controls the lighting units of the lighting zones to individually light up according to the lighting command, the light strip processing unit controls the lighting units corresponding to the first lighting zone and the lighting units corresponding to the $(N+1)^{th}$ lighting zone to switch off, and the light strip processing unit controls the lighting units corresponding to the $N^{th}$ lighting zone to light up.

9. The light strip zoning system as claimed in claim 1, wherein the control device is a smart device capable of having network connections; the control device further comprises a display unit, and the display unit is electrically connected to the processing unit;

wherein the communication unit of the control device is wirelessly communicatively connected to the light strip communication unit of the light strip device; the processing unit executes an application (App) for controlling the light strip device, and the processing unit controls the display unit to display a software interface of the App;

wherein the control device generates the start lighting signal, the zone configuration signal, or the return address signal according to a chosen option selected by the input unit among a plurality of options displayed on the software interface.

* * * * *